(12) United States Patent
Okmyanskiy et al.

(10) Patent No.: US 8,611,887 B1
(45) Date of Patent: Dec. 17, 2013

(54) TIMEZONE ASSIGNMENT TO WIRELESS USER DEVICES BASED ON DYNAMIC LOCATION AREA CODE SELECTION

(75) Inventors: Anton Okmyanskiy, Vancouver (CA); Jeffrey Antoline, Roswell, GA (US); Robyn Sands, Lawrenceville, GA (US)

(73) Assignee: Cisco Technology, Inc., San Jose, CA (US)

( * ) Notice: Subject to any disclaimer, the term of this patent is extended or adjusted under 35 U.S.C. 154(b) by 714 days.

(21) Appl. No.: 12/890,919

(22) Filed: Sep. 27, 2010

(51) Int. Cl.
*H04W 4/00* (2009.01)

(52) U.S. Cl.
USPC .................. 455/422.1; 455/446; 455/456.1; 370/328

(58) Field of Classification Search
USPC ......... 455/418, 422.1, 432.1, 433, 436, 444, 455/446, 449, 456.1–457, 461, 524, 525, 455/561; 370/328, 329, 331, 338, 352, 401; 379/221.14
See application file for complete search history.

(56) References Cited

U.S. PATENT DOCUMENTS

| | | | |
|---|---|---|---|
| 2009/0181688 A1* | 7/2009 | Claussen et al. | 455/450 |
| 2009/0318193 A1 | 12/2009 | Littlefield et al. | |
| 2010/0210280 A1 | 8/2010 | Haynes et al. | |
| 2010/0248720 A1 | 9/2010 | Millet et al. | |
| 2010/0291897 A1 | 11/2010 | Ghai | |
| 2012/0020307 A1* | 1/2012 | Henderson et al. | 370/329 |

* cited by examiner

*Primary Examiner* — George Eng
*Assistant Examiner* — Marcus Hammonds
(74) *Attorney, Agent, or Firm* — Edell, Shapiro & Finnan, LLC (57) ABSTRACT

Techniques are provided to set the timezone of a wireless user device in a wireless cellular communication network when the wireless user device is being served by a radio access point device rather than a macro base transceiver station. At a provisioning server configured to provision radio access point devices to operate in a wireless cellular communication network, a determination is made as to which timezone sub-region a radio access point device configured to operate in the wireless cellular communication network is located and selects a set of location area codes among the plurality of sets of location area codes assigned to the sub-region in which the radio access point device is determined to be located based on which of a plurality of radio access point gateway devices serves that radio access point device. The provisioning server sends the selected set of location area codes to the radio access point device. The location area codes are used by a wireless user device to request its timezone from a mobile switching center when the wireless user device is served by a radio access point device.

23 Claims, 7 Drawing Sheets

TIMEZONE ASSIGNMENT TO WIRELESS USER DEVICES BASED ON DYNAMIC LOCATION AREA CODE SELECTION

TECHNICAL FIELD

The present disclosure relates generally to wireless cellular communication networks and to configuring timezone assignment for wireless user devices served by radio access point devices operating in a wireless cellular communication network.

BACKGROUND

Femtocell is an emerging technology targeted for 3G/4G technologies such as a Universal Mobile Telecommunication System (UMTS), Code Division Multiplex Access (CDMA) systems, WiMax™ systems and Long Term Evolution (LTE) systems. Femtocells access points (AP) are radio access point devices that serve as mini cell tower devices to improve coverage of service to wireless user devices and offload mobile infrastructure of the mobile service provider by utilizing a subscriber's backhaul wide area network connection.

A wireless user device, also called User Equipment (UE), such as a cell phone or Smartphone, connects via the radio access point device to the wireless service provider's network. In a standard 3G system, the UE obtains its timezone information from the mobile switch center (MSC) in the wireless service provider's network. For macro cell towers, the location area code (LAC) included in the over-the-air (OTA) transmission from a macro cell tower can be used to differentiate the timezones and provide the appropriate timezone indicator to the UE. Radio access point devices, however, can be located in different time zones yet connect to the same gateway equipment, which in turn can connect to the same MSC. Consequently, the MSC needs to respond with a different timezone indicator to UE location requests sent via radio access point devices in different timezones.

To accomplish a mechanism for assigning the correct timezone to a UE that is served by a radio access point device, it is necessary to identify the location of the radio access point device and its timezone. Moreover, the assignment of LACs to radio access point devices is dynamic because radio access point devices go on and off the wireless cellular network with new and changing subscriber accounts.

DESCRIPTION OF EXAMPLE EMBODIMENTS

Overview

Techniques are provided to set the timezone of a wireless user device in a wireless cellular communication network when the wireless user device is being served by a radio access point device rather than a macro radio base transceiver station or tower. At a provisioning server configured to provision radio access point devices to operate in the wireless cellular communication network, data is stored representing sub-regions of a geographical coverage area of the wireless cellular communication network such that each sub-region covers no more than one timezone and data is stored that assigns a plurality of sets of location area codes to each sub-region, wherein each location area code serves as a unique reference for a location of a wireless user device during a communication session in the wireless cellular communication network. The provisioning server also stores data that assigns respective ones of a plurality of radio access point gateway devices to serve as gateways for control messaging and traffic to and from corresponding radio access point devices and data assigning respective ones of the plurality of radio access point gateway devices to a corresponding set of location area codes. The provisioning server determines in which sub-region a radio access point device configured to operate in the wireless cellular communication network is located based on the stored data representing the sub-regions and an expected location or actual location of the radio access point device. The provisioning server selects a set of location area codes among the plurality of sets of location area codes assigned to the sub-region in which the radio access point device is determined to be located and based on at least one particular radio access point gateway device of the plurality of radio access point gateway devices that the radio access point device is assigned to, and sends the selected set of location area codes to the radio access point device.

At a mobile switching center in the wireless cellular communication network, timezone data is stored indicating the timezone for each set of location area codes for each sub-region that the mobile switching center is configured to control. Thereafter, the mobile switching center receives a location update request from a particular wireless user device that detects a location area code from the selected set of location area codes that is broadcast by the radio access point device, the location update request including the location area code detected by the particular user device. The mobile switching center determines the timezone for the particular user device based on the location area code included in the location update request and sends a message to be directed to the radio access point for transmission to the particular user device, the message indicating the timezone for the particular wireless user device.

Example Embodiments

Figure 1:
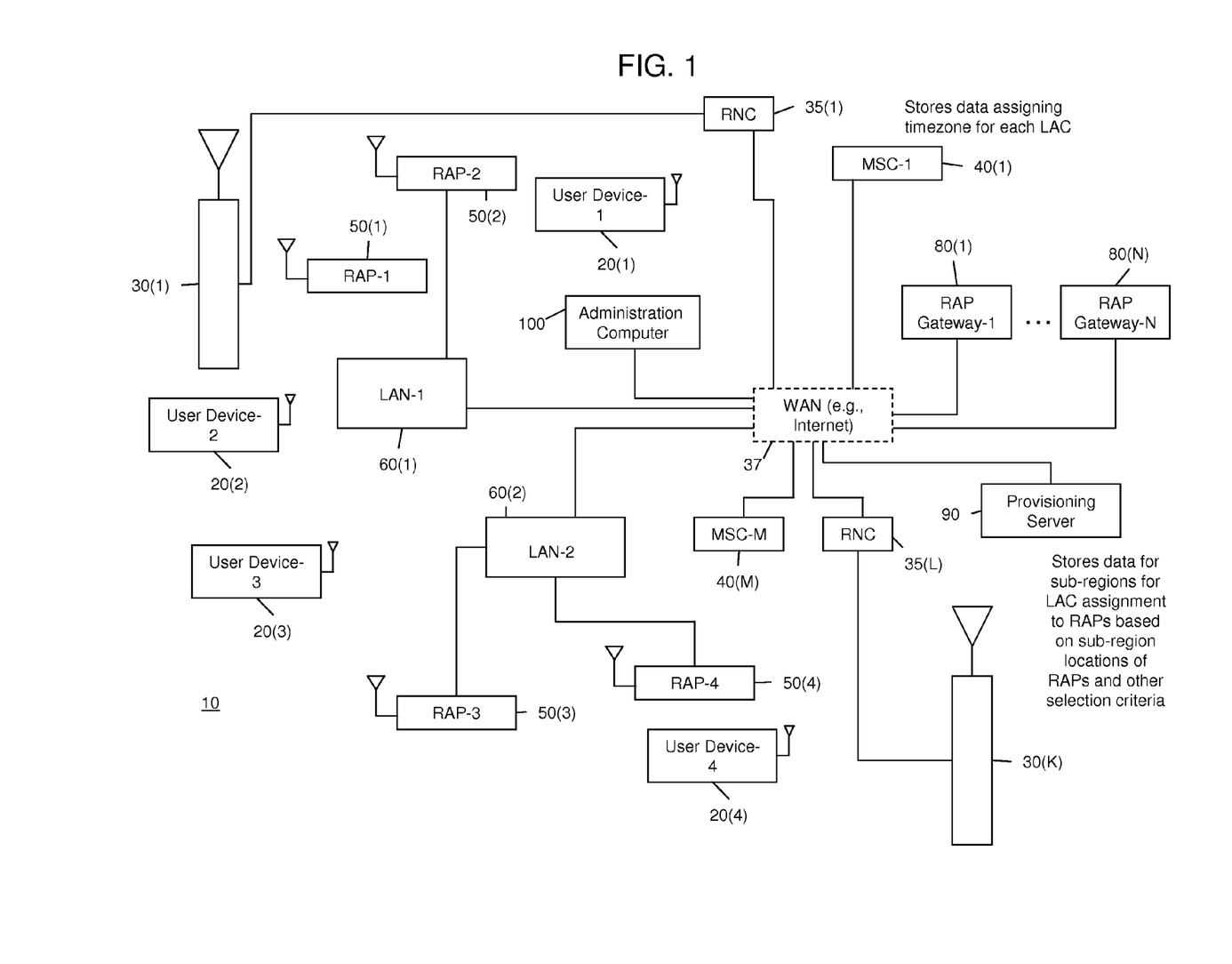
FIG. 1 is an example of a block diagram of components in a wireless cellular communication network that are configured to assign timezones to wireless user devices served by radio access point devices based on dynamic location area code selection.

Referring first to FIG. 1, a block diagram is provided showing infrastructure components in a wireless cellular communication network 10 that are configured to assign timezones to wireless user devices based on dynamic location area code selection. The network 10 includes several infrastructure elements that are configured to manage operations for the network 10 and to facilitate certain operations described herein. The network 10 is a wide area wireless cellular communication network, such as one that is built according to the "3G" wireless communication standard specifications. The network 10 is designed to provide a variety of voice and data services to wireless user devices. Examples of wireless user devices are shown at reference numerals 20(1)-20(4). Wireless user devices are also referred to herein as User Equipment (UE) in accordance with 3G terminology.

In order to serve wireless user devices, there are long range or "macro" cell base transceiver stations that are configured to serve relatively large coverage areas (measured in miles or km). Examples of macro cell base station transceiver stations are shown at 30(1)-30(K). The macro base transceiver stations are controlled by radio network controllers. Examples of radio network controllers (RNCs) are shown at reference numerals 35(1)-35(L). The RNCs 35(1)-35(L) communicate with mobile switching centers (MSCs) 40(1)-40(M) via a wide area network (WAN), e.g., the Internet shown at reference numeral 37. The RNCs 35(1)-35(L) also interface voice calls to a public telephone network (not shown) and interface voice or data sessions to the Internet 37.

Efforts have been made to improve the delivery of wireless services to wireless user devices when they are out of range of a macro cell base transceiver station, such as when the wireless user devices are located within a building for example. Wireless service to user devices located within large buildings becomes degraded because the user device has difficulty receiving a signal from the base transceiver station even if the building is well within the coverage area of the base station. Accordingly, wireless transceiver devices with relatively small coverage areas (and serving capacities) are deployed inside buildings. Depending on their coverage area and serving capacities, these wireless transceiver devices are referred to as "femto" cell or "pico" cell access point devices. For simplicity and generality, the term radio access point (RAP) device is meant to refer to a wireless transceiver device that is configured to serve wireless client devices over relatively small coverage areas and with generally less capacity as compared to a macro base transceiver station. Another term for a RAP device is a "micro" base station. Examples of RAP devices are shown at reference numerals 50(1)-50(4). In 3G terminology, these RAP devices are referred to Home Node B (HNB) devices. Again, the RAP devices are configured to provide the same type of wireless services to client devices when the wireless client devices are out of range of a macro base transceiver station. The relatively small coverage area of a RAP device is measured in terms of feet or meters. RAP devices are quite portable and readily movable from one location to another location whereas a macro base transceiver station cannot be readily removed from one location to another. Macro base transceiver stations are fixed at a desired location.

The RAP devices may be deployed within or near a building (e.g., small or large business enterprise or a home) and are connected to a wired local area network (LAN), which are in turn connected to the Internet 37. For example, RAP devices 50(1) and 50(2) are connected to a first LAN 60(1) and RAP devices 50(3) and 50(4) are connected to a second LAN 60(2). There may be several more RAP devices, but for simplicity they are not shown in FIG. 1.

There are additional infrastructure elements shown in FIG. 1 to assist in managing the network 10. For example, there are one or more access controllers (also referred to herein as RAP gateway devices), two of which are shown at 80(1) and 80(2) in FIG. 1. An access controller is assigned to a group of RAP devices and serves as a gateway for control messaging and traffic to and from the RAP devices. A provisioning server 90 is also provided that serves as a more centralized control point to provision RAP devices in the network 10 and also to provide a user interface point for a network administrator to provide configuration commands/data as well as to view the status of the network 10. The provisioning server 90 is coupled to the Internet 37 and may communicate via the appropriate RAP gateway with RAP devices served by that RAP gateway. There may be more than one provisioning server 90 to serve all the RAP devices in a given network deployment. The provisioning server 90 configures the assignment of RAP devices to RAP gateway devices and this may change from time to time when the provisioning server 90 provisions a RAP device to operate at a different location.

An administration computer is shown at reference numeral 100 and may comprise a standard computer, server computer, work station or virtualized computer that is coupled to the Internet 37 and is configured to provide data to the provisioning server 90 and to the mobile switching centers 40(1)-40(M).

There are multiple RAP devices deployed in different locations throughout areas where coverage is desired for the wireless network. RAP devices act as mini cellular radio transceiver towers in that they operate in licensed spectrum just like the larger and fixed cellular radio transceiver towers. However, since RAPs are by their nature movable from one location to another, deployment and service activation of RAPs involves location verification in order to ensure compliance with regulatory requirements. A RAP communicates with the provisioning server 90 via the Internet 37 and through a RAP gateway device. The provisioning server 90 manages activation of RAPs 50(1)-50(4) in the wireless cellular communication network. The RAPs route traffic associated with communication sessions with wireless user devices via the Internet 37 to one of the mobile switching centers (MSCs) 40(1)-40(M).

The coverage area of a cellular radio network is usually divided into location areas or regions. Location areas are comprised of one or several radio cells. Each location area is given a unique number within the network, called a Location Area Code (LAC). A LAC is used as a unique reference for the location of a wireless user device during a communication session (voice or data) in the wireless cellular communication network, and is also used to address the wireless user device in the case of an incoming call or other type of communication session for a UE in the wireless cellular communication network. The LAC forms a part of the Location Area Identifier (LAI) and is broadcast on the Broadcast Control Channel (BCCH) by a base station (macro base transceiver station or RAP device).

Techniques are provided herein to deliver information to a UE, via a RAP device, indicating to the UE the timezone in which the UE is located based on the RAP device that is serving the UE in the wireless cellular communication network 10. In standard 3G systems, the UE learns its timezone from an MSC that serves the macro base transceiver station that serves the UE. This is more complex when a UE is being served by a RAP device, which by its nature, is mobile. Moreover, RAP devices can be located in different timezones yet be served by the same RAP gateway, which in turn can connect to the same MSC or to different MSCs. When UEs are being served by a macro base transceiver station ("tower"), the LAC of the macro base transceiver station can be used to differentiate the timezones and provide an appropriate timezone indicator to the UE. This is relatively straightforward because each macro cell base transceiver station has a static location and is manually/statically configured one time.

In a RAP device environment, the MSC needs to respond with a different timezone indicator to UE location requests. To accomplish this, the RAP devices in the same timezone need to share the same LAC. Moreover, the location of a RAP device is dynamic and a given RAP device may require a different LAC depending on its current location. This involves identifying the location of the RAP device and its timezone. Furthermore, a single LAC cannot be assigned to a RAP device because it may conflict with other RAP device neighbors. The total number of LACs in an area is constrained for UE rejection optimizations. The assignment of LACs to RAP devices is dynamic as RAP devices come and go on the network with RAP subscriber accounts. The dynamic nature of LAC to RAP device assignment complicates the process of identifying the timezones by LAC for RAP devices at an MSC.

Accordingly, the techniques described herein dynamically detect RAP device location, determine the sub-region in which the RAP device is located, select a set among a plurality of sets of LACs to a RAP device based on its sub-region location and other criteria (e.g., the RAP gateway device that serves the RAP device). A RAP gateway device may serve RAPs in different timezones. The RAP device selects the most suitable LAC from the selected set of LACs based on a scan of its radio environment.

Figure 2:
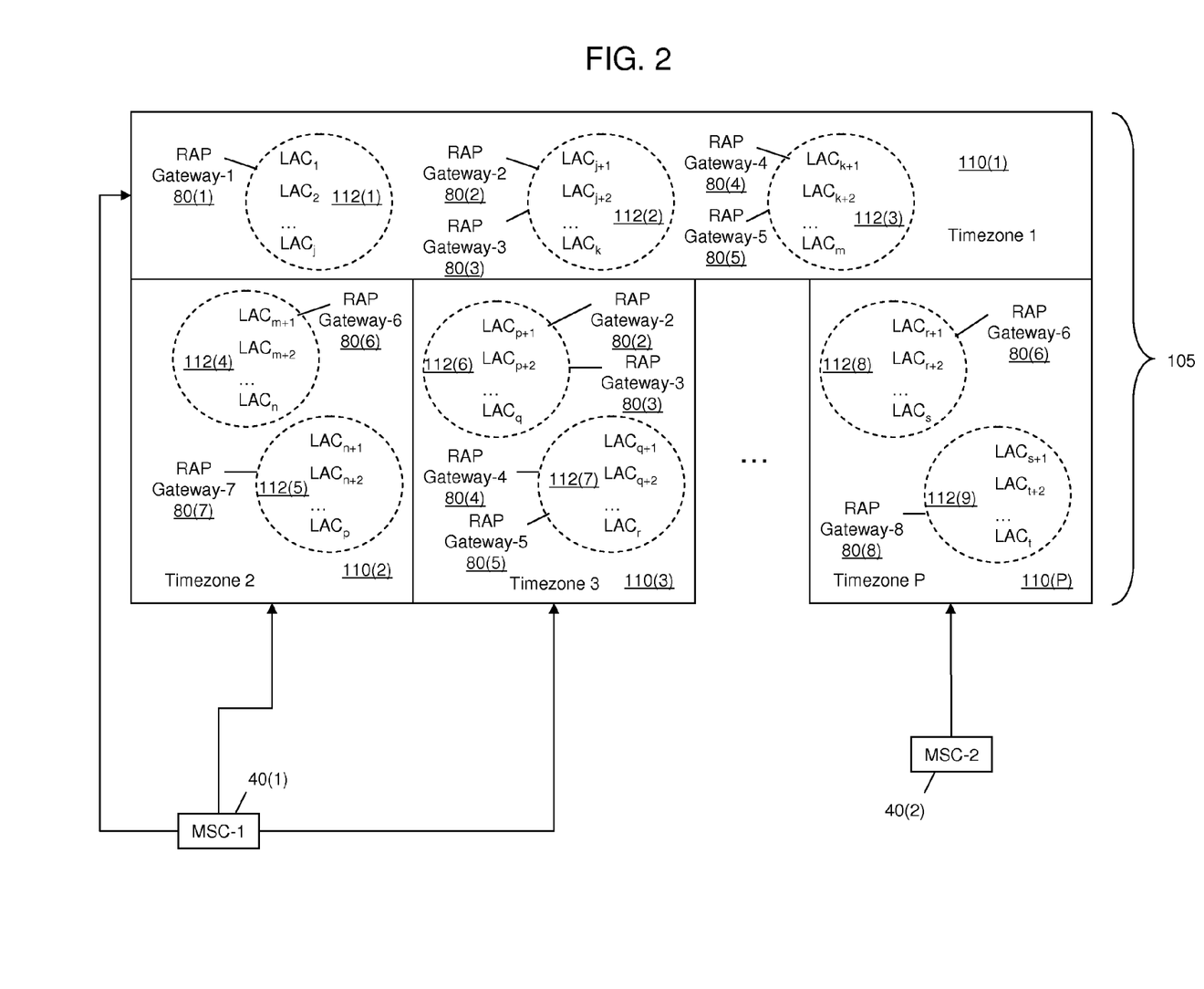
FIG. 2 is an example of a diagram showing the division of a geographical coverage area of a wireless cellular communication network into sub-regions according to the techniques described herein.

Reference is now made to FIG. 2 which shows an example of how a coverage area is divided or segmented into sub-regions. A geographical coverage area 105 is divided into sub-regions 110(1)-110(P) which are smaller geographical areas in the any polygonal shape and not necessarily contiguous. Each sub-region covers no more than one timezone. For example, sub-region 110(1) covers Timezone 1, sub-region 110(2) covers Timezone 2, sub-region 110(3) covers Timezone 3, and sub-region 110(P) covers Timezone P. There may be more than one sub-region within a timezone. For example, there may be two sub-regions 110(1a) and 110(1b) (not specifically shown in FIG. 2) each of which is in Timezone 1.

In addition, multiple (two or more) sets of LACs are assigned to each sub-region. For example, sets 112(1), 112(2) and 112(3) of LACs are assigned to sub-region 110(1) for Timezone 1. Set 112(1) comprises $LAC_1$-$LAC_j$, set 112(2) comprises $LAC_{j+1}$-$LAC_k$, and set 112(3) comprises $LAC_{k+1}$-$LAC_m$. Similarly, in sub-region 110(2) there are sets 112(4) and 112(5) of LACs, where set 112(4) comprises $LAC_{m+1}$-LAC. and set 112(5) comprises $LAC_{n+1}$-$LAC_p$. In sub-region 110(3) there are sets 112(6) and 112(7), where set 112(6) comprises $LAC_{p+1}$-$LAC_q$ and set 112(7) comprises $LAC_{q+1}$-$LAC_r$. Finally, in sub-region 110(P) there are sets 112(8) and 112(9), where set 112(8) comprises $LAC_{r+1}$-$LAC_s$ and set 112(9) comprises $LAC_{s+1}$-$LAC_t$. Again, each sub-region may comprise more than two sets of LACs and the arrangement shown in FIG. 2 is only an example. Again, a RAP gateway device may serve RAPs located in different (sub-regions) timezones.

Furthermore, a set of LACs is assigned to particular RAP gateway devices or to sets of multiple redundant RAP gateway devices when redundancy is used for the RAP gateway devices that are assigned to be responsible for RAP devices. The provisioning server assigns a RAP device to a particular RAP gateway device or to several redundant RAP gateway devices. There are numerous techniques for this RAP device-to-RAP gateway device assignment. For example, a RAP gateway device is assigned to cover RAP devices in certain areas (for control messaging and traffic handling) and a RAP device is assigned to a gateway device based on its location. However, the mechanism for assigning RAP devices to RAP gateway devices is not essential to the LAC assignment other than to note that RAP devices are served by certain RAP gateway devices through some sort of assignment mechanism. A RAP gateway device or multiple RAP gateway devices are assigned to a given set of LACs. The identity of the RAP gateway device assigned to a given RAP device is used to select which of the plurality of sets of LACs (available within a timezone sub-region) are to be sent to a UE requesting a timezone update through that RAP device. For example, as shown in FIG. 2, in timezone sub-region 110(1), RAP Gateway-1 at reference numeral 80(1) is assigned to LAC set 112(1), RAP Gateway-2 at reference numeral 80(2) and RAP Gateway-3 at reference numeral 80(3) are redundant gateways assigned to LAC set 112(2) and RAP Gateway-4 at reference numeral 80(4) and RAP Gateway-5 at reference numeral 80(5) are redundant gateways assigned to LAC set 112(3). In timezone sub-region 110(2), RAP Gateway-6 at 80(6) is assigned to LAC set 112(4) and RAP Gateway-7 at 80(7) is assigned to LAC set 112(5). In timezone sub-region 110(3), RAP Gateway-2 and RAP Gateway-3 (also used for LACs in timezone sub-region 110(1)) are redundant gateways assigned to LAC set 112(6) and RAP Gateway-4 and RAP Gateway-5 (also used for LACs in timezone sub-region 110(1)) are assigned to LAC set 112(7). Finally, in timezone sub-region P, RAP Gateway-6 (also used for LACs in timezone sub-region 110(1)) is assigned to LAC set 112(8) and RAP Gateway-1 (also used for LACs in timezone region 110(1)) is assigned to LAC set 112(9). Thus, FIG. 2 shows that multiple (e.g., pairs of) redundant RAP gateway devices may be assigned responsibility for the same LAC set and a given RAP gateway device (or multiple redundant pairs of RAP gateway devices) may be responsible for LAC sets in multiple timezone sub-regions.

MSC 40(1) is configured to handle traffic from the infrastructure equipment (RAPs and macro base transceiver stations) in sub-regions 110(1), 110(2 and 110(3) as indicated in FIG. 2. MSC 40(2) is configured to handle traffic from the infrastructure equipment in sub-region 110(P). The sub-region definition (the locations of the boundaries for each sub-region, i.e., coordinates of the locations for the sub-region boundaries) and LAC assignments depicted in FIG. 2 are performed by, for example, operations at the administration computer 100 shown in FIG. 1 that communicates with the provisioning server 90 and the MSCs 40(1)-40(M).

Figure 3:
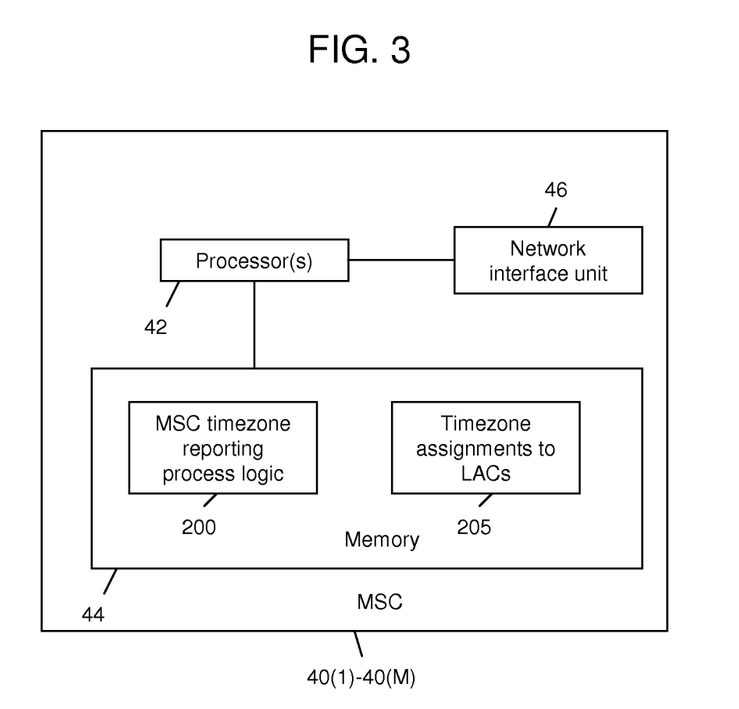
FIG. 3 is an example of a block diagram of a mobile switching center that stores data and participates in the timezone assignment techniques described herein.

FIG. 3 shows an example of a block diagram of any of the MSCs 40(1)-40(M) shown in FIG. 1. The MSC comprises one or more processors 42, a memory 44, and a network interface unit 46. The processor(s) 42 execute various programs stored in memory 44 including MSC timezone reporting process logic 200. The MSC timezone reporting process logic 200 causes the processor(s) 42 to perform the MSC functions described hereinafter in connection with FIGS. 6 and 7. In addition, the MSC stores data representing timezones assigned for each LAC as shown at 205. The network interface unit 46 is configured to perform communications over a network, e.g., the Internet 37 shown in FIG. 1.

Figure 4:
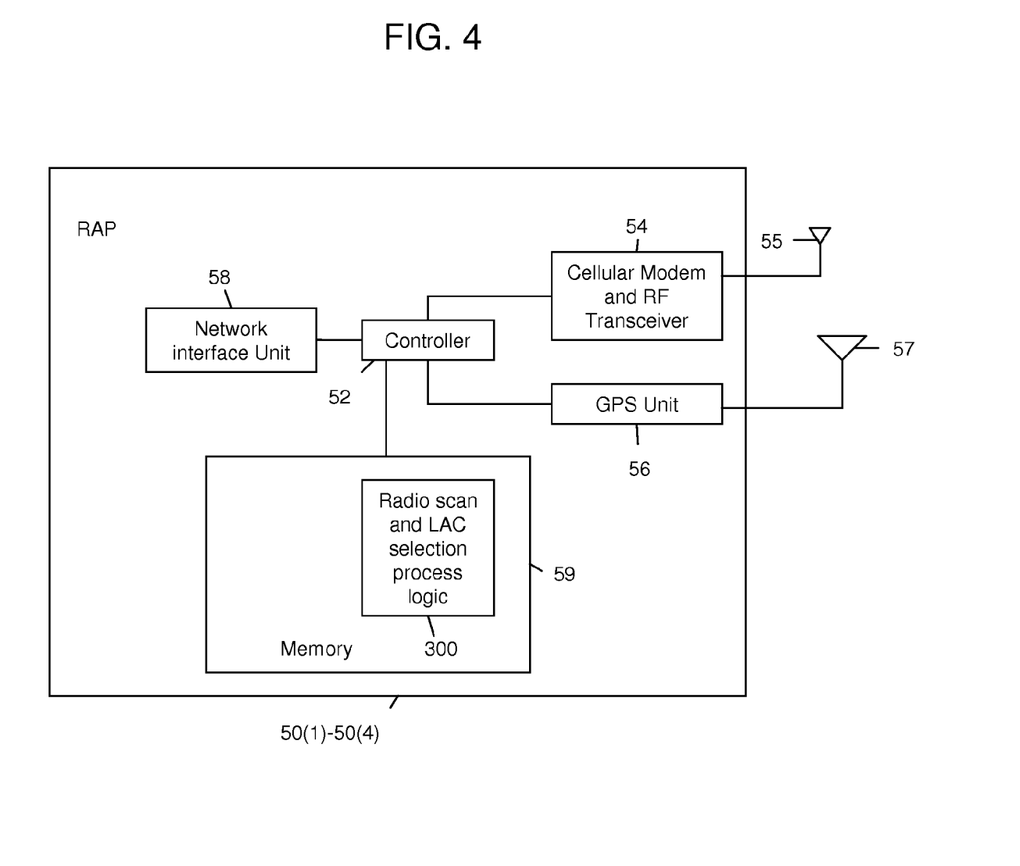
FIG. 4 is an example of a block diagram of a radio access point device configured to participate in the timezone assignment techniques described herein.

Turning now to FIG. 4, an example block diagram is shown of any one of the RAP devices 50(1)-10(4). The RAP device comprises a controller 52 that serves as the primary control component of the RAP. There is a cellular modem and radio frequency (RF) transceiver unit 54 that is configured to perform the baseband and RF signal processing required to transmit and receive over-the-air signals according to a desired wireless communication standard that is employed in the wireless cellular network, much like the signals transmitted by the cellular radio transceiver towers. The cellular modem and RF transceiver unit 54 transmits signals and receives wireless (RF) signals via the antenna 55 in order to serve UEs in the wireless cellular network (FIG. 1). Thus, the RAP is said to be "enabled" or "re-enabled" for service when it has been configured or commanded to transmit and receive wireless radio signals with respect to UEs operating in the wireless cellular network. There is also a GPS receiver unit 56 that receives signals from GPS satellite transmitters via antenna 57. The controller 52 performs high level control of the cellular modem and RF transceiver 54 as well as the GPS receiver unit 56. A network interface unit 58 is provided that connects to the controller 52. The network interface unit 58 enables communication over a network, e.g., one of the LANs shown in FIG. 1 and ultimately the Internet 37.

The controller 52 may, in one example, be a programmable microprocessor or microcontroller, etc., that executes instructions encoded in a processor readable memory medium, e.g., memory 59. To this end, there are instructions encoded or otherwise stored in the memory 59 for radio scan and LAC selection process logic 300 encoded or otherwise stored in the memory 59. The controller 52 executes the radio scan and LAC selection process logic 300 when it receives a set of LACs from the provisioning server as described hereinafter in connection with FIG. 7.

The controller 52 is a data processing device, e.g., a microprocessor, microcontroller, systems on a chip (SOCs) processing device, or other fixed or programmable logic. The controller 52 interfaces with the memory 59 that may be any memory device, such as random access memory (RAM), read only memory (ROM), CD-ROM, storage disk, FLASH memory device, or other tangible machine (computer or processor) readable tangible memory medium or storage device that stores data and instructions used for the techniques described herein. The memory 59 may be separate or part of the controller 52.

The functions of the controller 52 may be implemented by a processor or computer readable tangible memory medium encoded with instructions or by logic encoded in one or more tangible media (e.g., embedded logic such as an application specific integrated circuit (ASIC), digital signal processor (DSP) instructions, software that is executed by a processor, etc.), wherein the memory 59 stores data used for the computations or functions described herein (and/or stores software or processor instructions that are executed to carry out the computations or functions described herein).

Figure 5:
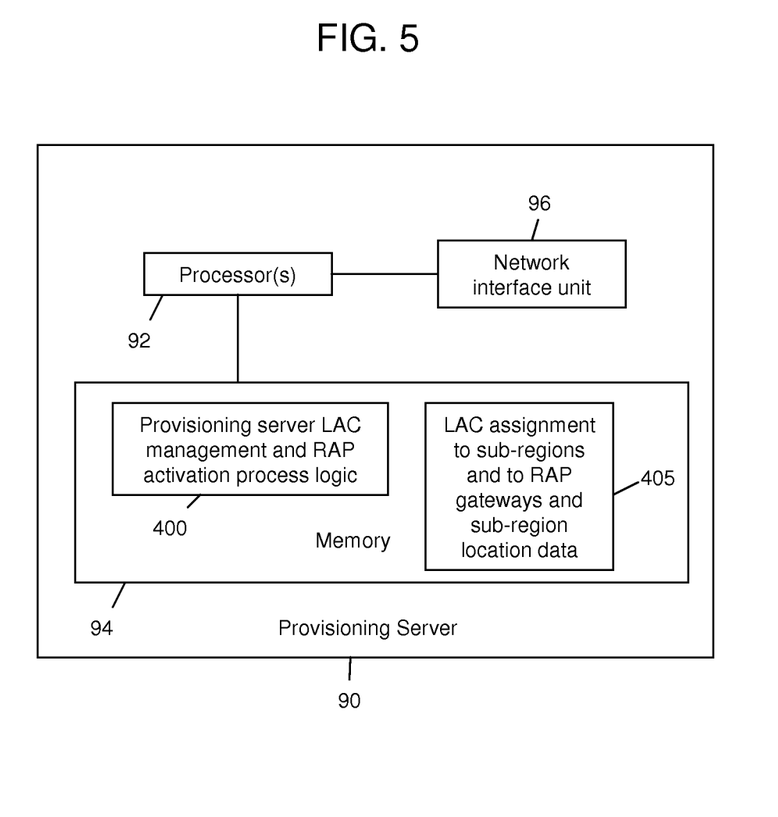
FIG. 5 is an example of a block diagram of a provisioning server configured to store data and participate in the timezone assignment techniques described herein.

Reference is now made to FIG. 5 for a description of a block diagram of the provisioning server 90. The provisioning server 90 comprises a controller consisting of, for example, one or more processors 92. The provisioning server also comprises a memory 94 and a network interface unit 96. The processor(s) 92 execute various programs stored in memory 94 to perform a variety of provisioning server functions. To this end, the memory 94 stores provisioning server LAC management and RAP activation process logic 400, that when executed, by the processor(s) 22, cause the processor(s) 22 to perform the operations described herein for the provisioning server 90. The network interface unit 26 is configured to enable communications over a network, e.g., the Internet 37 shown in FIG. 1. The memory 94 also stores data 405 representing the assignment of LACs to sub-regions, data assigning RAP gateway devices to LAC sets, and data representing the boundary locations of the sub-regions, e.g., geographical coordinates defining the boundaries of the sub-regions. The operations of the provisioning server LAC management and RAP activation process logic 400 are described hereinafter in connection with FIGS. 6 and 7.

The processors 42 and 92 of the MCS and provisioning server, respectively, may take on any of the forms described herein for processor 52 of a RAP device. Moreover, the memory 44 and memory 94 may be any suitable tangible (non-transitory) processor or computer readable memory medium, similar to that described above for memory 59.

Figure 6:
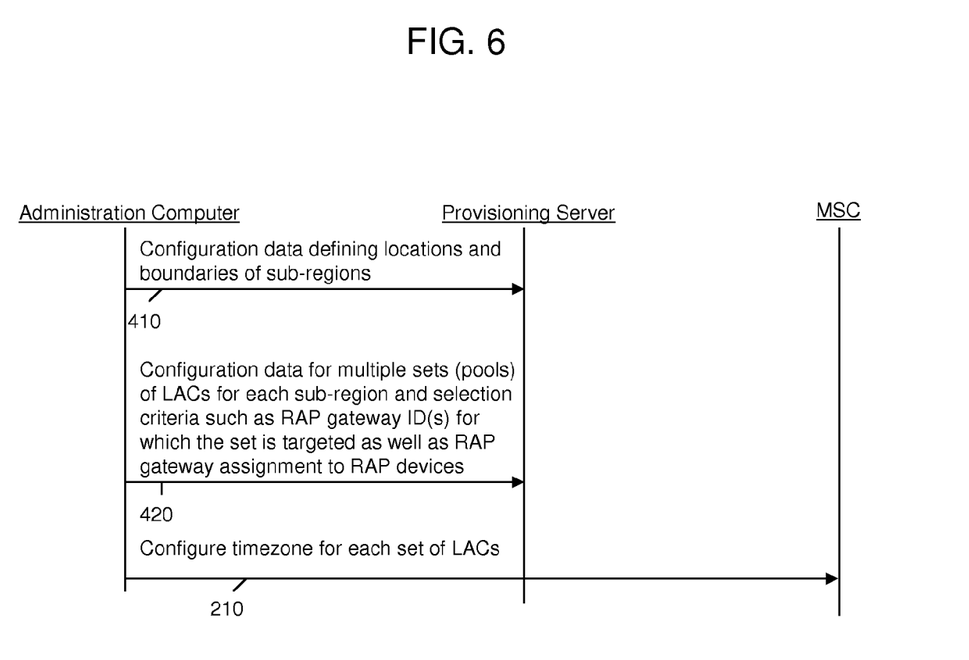
FIG. 6 is an example of a ladder flow diagram depicting operations associated with storing data for sub-regions and location area code assignments to sub-regions in the provisioning server and timezone assignments in the mobile switching center.
Figure 7:
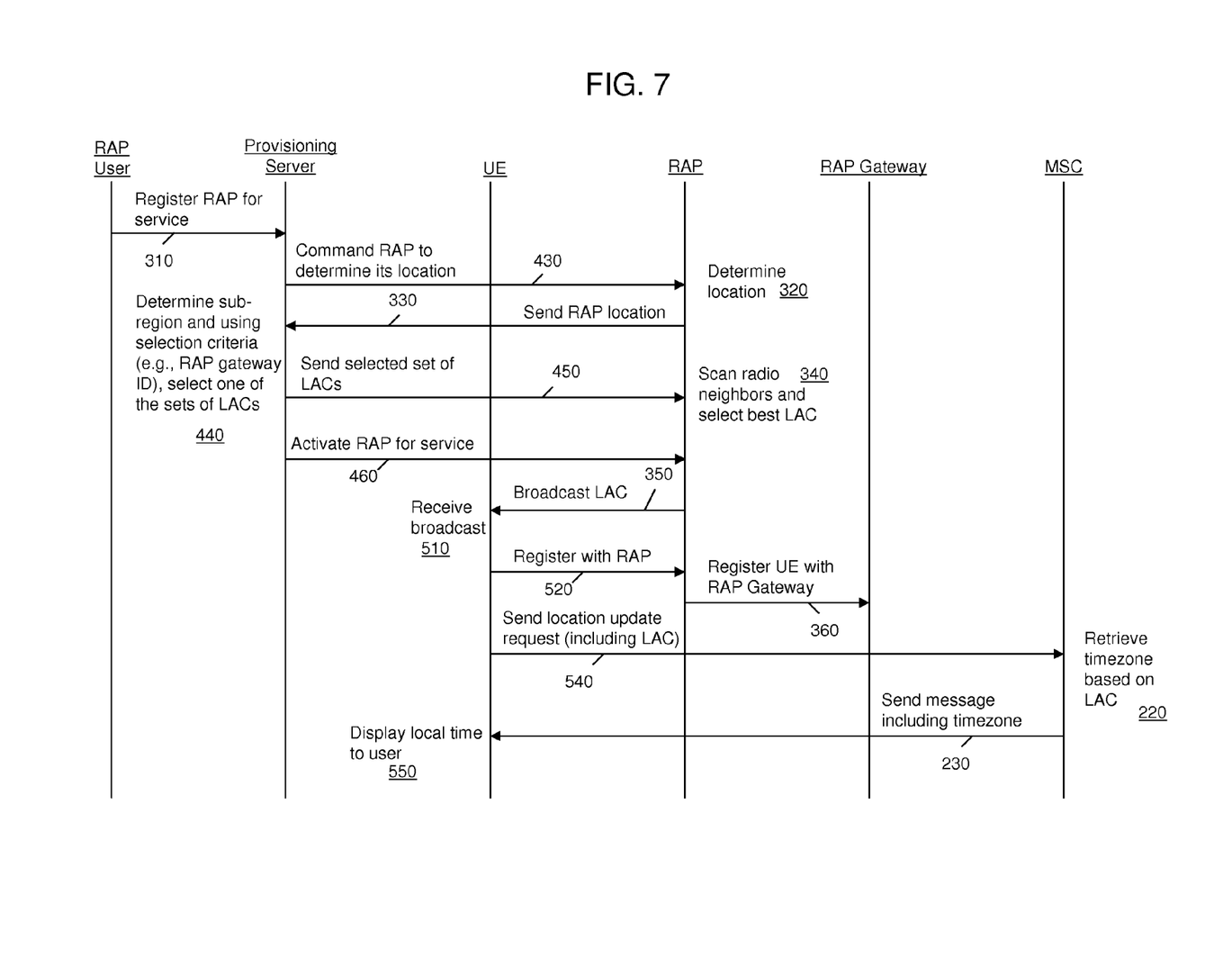
FIG. 7 is an example of a ladder flow diagram depicting operations of the provisioning server, radio access point device and mobile switching center in connection with the timezone assignment techniques described herein.

In FIGS. 6 and 7, operations with reference numerals in the 200's are operations of the MSC timezone reporting process logic 200 of an MSC, operations with reference numerals in the 300's are operations of the radio scan and LAC selection process logic 300 of a RAP device, and operations with reference numerals in the 400's are operations of the provisioning server LAC management and RAP activation process logic 400 of the provisioning server 90. Operations with reference numerals in the 500's are operations of a UE.

Reference is now made to FIG. 6 for an explanation of the configuration of data that is stored by the MSCs 40(1)-40(M) and the provisioning server 90. At 410, based on computations made on the administration computer, for example, data defining the sub-regions within a coverage area of a wireless cellular communication network is supplied to the provisioning server 90 for storage at the provisioning server 90. The data defining the sub-regions specifies coordinates for the boundaries of the polygon areas for each sub-region of the coverage area. Examples of the sub-regions are shown in FIG. 2 and they may take any shape. The determination of the boundaries of these sub-regions may be based on traffic load, geography and other network deployment parameters. At 420, data for multiple sets of LACs assigned to each sub-region is stored at the provisioning server 90. That is, data is stored at the provisioning server that assigns to each sub-region a plurality of sets of LACs. Also at 420, selection criteria (e.g., serving RAP gateway) used to select which set of the multiple sets of LACs are to be selected for and sent to a RAP is also stored by the provisioning server 90. An MSC serves multiple RAP gateway devices and each RAP gateway device serves multiple RAP devices. The same set of LACs is assigned to RAPs that are served by the same RAP gateway device. RAP gateway devices are assigned to serve as gateways for control messaging and provisioning of corresponding RAP devices by the provisioning server 90. At 420, data assigning respective ones of a plurality of RAP gateway device to serve as gateways for control messaging and traffic handling for corresponding RAP devices is included in the data sent for storage at the provisioning server 90. Moreover, as explained above in connection with FIG. 2, LAC sets are assigned to RAP gateway devices or multiple redundant RAP gateway devices. In addition, RAP gateway devices may be assigned to LAC sets in different timezones as depicted in FIG. 2. Data assigning respective ones of the plurality of RAP gateway devices to (at least one) corresponding set of LACs is also stored at the provisioning server 90 at operation 420.

At 210, the MSC receives timezone information for each LAC. In this way, an MSC may report to a UE the timezone for that UE based on the LAC of the RAP device that the UE sends in a location update request to the MSC.

Table 1 below illustrates the data stored at the provisioning server reflecting the assignment of sets of LACs to each sub-region for the example shown in FIG. 2.

TABLE 1

| Sub-region | Timezone | Sets of LACs |
|---|---|---|
| 110(1) | 1 | {$LAC_1, \ldots LAC_j$}; {$LAC_{j+1}, \ldots LAC_k$}; {$LAC_{k+1}, \ldots LAC_m$} |
| 110(2) | 2 | {$LAC_{m+1}, \ldots LAC_n$}; {$LAC_{n+1}, \ldots LAC_p$} |
| 110(3) | 3 | {$LAC_{p+1}, \ldots LAC_q$}; {$LAC_{q+1}, \ldots LAC_r$} |
| ... | ... | ... |
| 110(P) | P | {$LAC_{r+1}, \ldots LAC_s$}; {$LAC_{s+1}, \ldots LAC_t$} |

For example, timezone 1 is Eastern Standard Time (EST), timezone 2 is Central Standard Time (CST), timezone 3 is Pacific Standard time (PST).

Table 2 below illustrates the data stored at the provisioning server reflecting the use of RAP assignment to RAP gateway devices as an additional criteria used at the provisioning server to select the set of LACs for a RAP device.

TABLE 2

| RAP Gateway Device | Set of LACs |
|---|---|
| 80(1) | 112(1) = {$LAC_1, \ldots LAC_j$} |
| 80(2), 80(3) | 112(2) = {$LAC_{j+1}, \ldots LAC_k$} |
| 80(4), 80(5) | 112(3) = {$LAC_{k+1}, \ldots LAC_m$} |
| 80(6) | 112(4) = {$LAC_{m+1}, \ldots LAC_n$} |
| 80(7) | 112(5) = {$LAC_{n+1}, \ldots LAC_p$} |
| 80(2), 80(3) | 112(6) = {$LAC_{p+1}, \ldots LAC_q$} |
| 80(4), 80(5) | 112(7) = {$LAC_{q+1}, \ldots LAC_r$} |
| ... | |
| 80(6) | 112(8) = {$LAC_{r+1}, \ldots LAC_s$} |
| 80(8) | 112(9) = {$LAC_{s+1}, \ldots LAC_t$} |

In Table 2, the reference numbers for the RAP gateway devices track the identifiers of the RAP gateway devices shown in FIG. 2 and the association of RAP gateway devices to LAC sets shown in FIG. 2. Table 2 shows that in some cases, a single RAP gateway device is assigned to a LAC set and in other cases, multiple redundant RAP gateway devices are assigned to a LAC set. In addition, as described above, RAP gateway device (or pairs of redundant gateway devices) may be assigned to LAC sets in different timezone sub-regions.

TABLE 3

| RAP Gateway Device | RAP Device Service Responsibility |
|---|---|
| 80(1) | 50(1) |
| 80(2), 80(3) | 50(2), 50(4) |
| 80(4), 80(5) | |
| 80(6) | 50(3) |
| 80(7) | |
| 80(8) | |

Table 3 shows the assigned responsibility of RAP gateway devices for RAP devices. In some cases, a single RAP gateway device is responsible for serving a RAP device and in other cases multiple redundant (e.g., pairs of) RAP gateway devices are assigned responsibility for a RAP gateway device. For example, RAP gateway devices 80(2) and 80(3) are responsible for RAP devices 50(2) and 50(4). It is to be understood that only four RAP devices 50(1)-50(4) are referred to herein as an example, but that there are numerous RAP devices in a given mobile service provider's network and each RAP gateway device is responsible for numerous RAP devices as well.

Table 4 below represents data stored at a MSC 40(1) for multiple sets of LACs that it serves and Table 5 below represents data stored at MSC 40(2) for the multiple sets of LACs that it serves, according to the example shown in FIG. 2.

TABLE 4

| Timezone | Sets of LACs |
|---|---|
| 1 | {$LAC_1, \ldots LAC_j$}; {$LAC_{j+1}, \ldots LAC_k$}; {$LAC_{k+1}, \ldots LAC_m$} |
| 2 | {$LAC_{m+1}, \ldots LAC_n$}; {$LAC_{n+1}, \ldots LAC_p$} |
| 3 | {$LAC_{p+1}, \ldots LAC_q$}; {$LAC_{q+1}, \ldots LAC_r$} |

TABLE 5

| Timezone | Sets of LACs |
|---|---|
| P | {$LAC_{r+1}, \ldots LAC_s$}; {$LAC_{s+1}, \ldots LAC_t$} |

Thus, the decision as to which set of LACs to select and assign to a RAP device is made based on the sub-region in which the RAP device is determined to be located and some other criteria, such as the RAP gateway device that serves that RAP. The provisioning server 90 stores information representing the RAP gateway device that serves each RAP device. In the example of FIG. 1 where there are 4 RAP devices 50(1)-50(4), the provisioning server 90 may store data shown in Table 2 above indicating that RAP device 50(1) is served by RAP gateway device 80(1) and RAP gateway device 80(1) is assigned LAC set {$LAC_1, \ldots LAC_j$}, RAP device 50(2) is served by RAP gateway device 80(2) and RAP gateway device 80(2) is assigned LAC set {$LAC_{j+1}, \ldots LAC_k$}, RAP device 50(3) is served by RAP gateway device 80(4) and RAP gateway device 80(4) is assigned LAC set {$LAC_{m+1}, \ldots LAC_n$}, and RAP device 50(4) is served by RAP gateway device 80(6) and RAP gateway device 80(7) is assigned LAC set {$LAC_{p+1}, \ldots LAC_q$}.

As depicted in FIGS. 2 and 6 and Tables 1-5 described above, the provisioning server stores data representing sub-regions of a geographical coverage area of a wireless cellular communicating network such that each sub-region covers no more than one timezone. The data representing the sub-regions comprises coordinate data describing locations of the boundaries of each sub-region. At an MSC, timezone data is stored that indicates the timezone for each set of LACs for each sub-region of the wireless cellular communication network that the MSC is configured to control.

Reference is now made to FIG. 7 for a description of the overall process flow when a UE device requests a location update for timezone information. At 310, a RAP device user boots up the RAP device and the RAP device registers for service with the provisioning server. At 430, the provisioning server 90 sends a message to the RAP device that commands the RAP to determine its location, unless the provisioning server 90 uses a pre-configured expected location of the RAP device. Each RAP device is configured to operate at a predetermined geographic location and that location is its expected location. The provisioning server 90 stores information for the expected location of each RAP device that it provisions. Using the medium access control (MAC) address or IP address for that RAP device, the provisioning server 90 may look up the RAP device's expected location that provisioning server stores. In some cases, the provisioning server 90 may rely on the expected location and not perform the operation 430. When the RAP device receives the message from the provisioning server 90 sent at 430, at 320 the RAP device determines its location. The RAP device may use its GPS receiver unit to receive GPS satellite signals and determine its GPS location. Alternatively, the RAP device may determine its location by scanning neighbor macro base transceiver stations and supplying that information to the provisioning server 90, whereby the provisioning server analyzes the identities of the macro base transceiver stations towers that the RAP device has detected (from signals broadcasted by the base station towers) and since the locations of the macro base transceiver stations are known (and fixed), the provisioning server 90 can derive a location for the RAP device from that information At 330, the RAP device sends a message containing its GPS location (if it used a GPS location procedure to determine its location) or a message containing the macro base transceiver station(s) that the RAP device detected.

At 440, the provisioning server 90 determines the sub-region in which the RAP device is located based on the stored data representing the sub-regions and an expected location or actual location of the RAP device. Also at 440, the provisioning server 90 selects one of the sets of LACs among the plurality of sets of LACs assigned to that sub-region. The LAC set selection operation is based further on at least one particular RAP gateway device that the RAP device is assigned to and this is determined from stored information indicating the RAP gateway device-to-RAP device assignment. For example, the provisioning server refers to data represented by Table 3 above to determine the RAP gateway assigned for a RAP device and uses that with respect to data represented by Table 2 above to find the corresponding set of LAC for the RAP device based on its timezone region location and its RAP gateway (or multiple redundant RAP gateway that is responsible to serve it). For example, if RAP device 50(3) is seeking a timezone update and the provisioning server determines that it is located in timezone region 110(2) and given that RAP device 50(3) is served by RAP gateway 80(6), then the provisioning server selects LAC set 112(2) consisting of $\{LAC_{m+1}, LAC_n\}$. However, if the provisioning server determines that RAP device 50(3) is located in timezone P, then the provisioning server selects LAC set 112(9) consisting of $\{LAC_{r+1}, LAC_s\}$. In another example, if RAP device 50(2) is seeking a timezone update and the provisioning server determines that it is located in timezone 110(3), then the provisioning server selects LAC set 112(6) consisting of $\{LAC_{p+1}, LAC_q\}$ because RAP device 50(2) is served by redundant RAP gateway devices 80(2) and 80(3). On the other hand, if the provisioning server determines that RAP device 50(2) is located in timezone 110(1), then the provisioning server selects LAC set 112(2) consisting of $\{LAC_{j+1}, \ldots LAC_k\}$. For the case where multiple redundant RAP gateways have responsibility for a given RAP device, then the provisioning server's selection operation at 440 involves selecting a particular subset of a plurality of RAP gateway devices that the RAP device is assigned to, where the particular subset comprises multiple redundant RAP gateway devices to which the RAP device is assigned.

At 450, the provisioning server 90 sends a message containing the selected set of LACs to the RAP device. There a several ways/forms in which the location of the RAP device may be determined or derived. GPS location is one example when the RAP device has GPS capabilities and can obtain a GPS lock. A GPS location comprises latitude/longitude data for a RAP device. The provisioning server evaluates the latitude/longitude location data of the RAP device with respect to the geo-shapes of the sub-regions, i.e., locations of the boundaries of the sub-regions. In one variation, the provisioning server translates the latitude/longitude location data received from the RAP device to street address location data (street address, city, county and state) and determines in which sub-region the RAP device is located by evaluating the street address location data to determine in which county or state, for example, the RAP device is located and then using that information to determine in which sub-region that the RAP device is located. This technique is called "reverse geo-coding".

In still another variation, the provisioning server may trace a wired network packet received from the RAP device to a regional network operation center (NOC) that the packet passed through on route to the provisioning server, and then evaluates the location of the regional NOC to determine in which sub-region the RAP device is located based on the location of the regional NOC. For example, if a packet travels through a New York NOC, the provisioning server may select a set of LACs for that sub-region in the Eastern timezone. In yet another variation, the provisioning server determines a source Internet Protocol (IP) address assigned to a gateway router device (in the Internet 37 and not to be confused with a RAP gateway device) through which the RAP device communications to the provisioning server. The provisioning server derives an identity of the regional internet service provider (ISP) server that serves that gateway router device and evaluates the location of the region service provider server to determine the sub-region of the RAP device based on the location of the regional service provider server.

In still another variation, the RAP device scans its local radio environment to identify one or more macro base transceiver stations and sends that information to the provisioning server. The provisioning server receives this information and evaluates known locations for the one or more macro base transceiver stations detected by the RAP device with respect to the locations of the boundaries of the sub-regions.

Furthermore, as explained above, the provisioning server selects one of the multiple sets of LACs for the sub-region where the RAP device is determined to be located based on some selection criteria, such as the particular RAP gateway device that the RAP device is assigned to. Multiple RAPs served by the same RAP device are assigned the same set of LACs in the process depicted in FIG. 7.

At 340, the RAP device uses the selected set of LACs sent to it by the provisioning server and scans its radio environment to select the best LAC in that set. More specifically, the RAP device will detect broadcast signals from its radio neighbor RAP devices and determine which LAC is not already in use by one of its radio neighbors. In so doing, the RAP device selects the LAC that does not conflict with the LAC used by its radio neighbors.

At 460, the provisioning server 90 sends a message to the RAP device to activate the RAP device for service in the wireless cellular network. There may be additional verifications that the provisioning server makes prior to sending the message at 460. At 350, after the RAP device is activated for service, then it can broadcast signals making its service known to any nearby UEs and the broadcast signal includes the LAC that the RAP device selected at 340.

At 510, a UE receives the broadcast signal containing the LAC from the RAP device and at 520 registers for service with the RAP device, which registration request is forwarded to the RAP gateway at 360 by the RAP device.

At 540, as part of the normal operational flow, the UE sends a message containing a location update request that is received by the RAP device that the UE has registered with and is forwarded by the RAP device to the MSC (perhaps by an intermediate entity such as the RAP gateway) that is responsible for the sub-region in which the RAP device is located.

At 220, the MSC receives the location update request including the LAC from the UE and retrieves the timezone for the LAC based the information it stores mapping LACs to timezones. That is, the MSC determines the timezone for the particular user device based on the LAC included in the location update request. For example, in the example shown in FIG. 2, if a UE receives a broadcast signal that includes $LAC_1$ from RAP device 50(1), it includes $LAC_1$ in the location update request message that it sends at 540. The MSC 40(1) receives the location update request message and, based on the LAC-timezone mapping information the MSC 40(1) stores, it determines that the timezone to return to the UE is Timezone 2. At 230, the MSC sends a message, to be directed to the RAP device for transmission to the UE, which message indicates the timezone determined by the MSC, e.g., Timezone 2 in this example. At 550, the UE receives the message sent by the MSC, by way of a transmission from the RAP device, and the UE now has the updated timezone information for the current location of the UE. At 550, the UE can then display the local time to the user.

The techniques described herein involves a process of location area code assignments to radio access point devices to enable correct timezone configuration of a wireless user device by a mobile switching center. The location of the radio access point device is determined by any of a number of techniques, examples of which are described herein. Then, a set of candidate location area codes is selected for assignment to the radio access point device. The wireless user device connecting to the radio access point device learns about one of the location area codes in the set assigned to the radio access point device and sends it to mobile switching center that in turn responds with the correct timezone to the wireless user device based on stored location area code-to-timezone data. The radio access point device serving that wireless user device sends an over-the-air message containing the correct timezone information.

The techniques described herein allow for existing/standard flows between wireless user device and the mobile switching center remains unchanged as are the signaling flows between a radio access point device and a wireless user device. A given radio access point gateway device can serve multiple radio access point devices in any number of timezones since the sub-region location of a radio access point device is used (together with gateway device assignments) to determine which set of location area codes to select for a radio access point device. Moreover, a single mobile switching center can serve radio access point gateway devices in any number of timezones. The radio access point device can select the location area code with the fewest (or no) conflicts with a neighboring radio access point device.

The above description is intended by way of example only.

What is claimed is:

1. A method comprising:
    at a provisioning server configured to provision radio access point devices to operate in a wireless cellular communication network, storing data representing sub-regions of a geographical coverage area of the wireless cellular communication network such that each sub-region covers no more than one timezone, and data that assigns to each sub-region a plurality of sets of location area codes, each location area code serving as a unique reference for a location of a wireless user device during a communication session in the wireless cellular communication network;
    storing data that assigns respective ones of a plurality of radio access point gateway devices to a corresponding set of location area codes, the radio access point gateway devices serving as gateways for control messaging and traffic to and from corresponding radio access point devices;
    determining in which sub-region a radio access point device configured to operate in the wireless cellular communication network is located based on the stored data representing the sub-regions and an expected location or actual location of the radio access point device; and
    selecting a set of location area codes among the plurality of sets of location area codes assigned to the sub-region in which the radio access point device is determined to be located and further based on at least one particular radio access point gateway device of the plurality of radio access point gateway devices that the radio access point device is assigned to, and sending the selected set of location area codes to the radio access point device.

2. The method of claim 1, and further comprising at the provisioning server storing the data assigning radio access point gateway devices to corresponding sets of location area codes such that a radio access point gateway device is assigned to one or more sets of location area codes for one or multiple sub-regions.

3. The method of claim 1, wherein storing data representing the sub-regions comprises storing coordinate data describing locations of boundaries of each sub-region.

4. The method of claim 3, and further comprising receiving at the provisioning server from the radio access point device latitude/longitude location data for the radio access point device, and wherein determining in which sub-region the radio access point device is located comprises evaluating the latitude/longitude location data of the radio access point device with respect to the locations of the boundaries of the sub-regions.

5. The method of claim 4, and further comprising at the provisioning server translating the latitude/longitude location data received from the radio access point device to street address location data, and wherein determining in which sub-region the radio access point device is located comprises evaluating the street address location data.

6. The method of claim 3, wherein determining comprises tracing a received packet from the radio access point device at the provisioning server to a regional network operation center that the packet passed through and evaluating the location of the regional network operation center.

7. The method of claim 3, wherein determining comprises determining a source address assigned to a gateway router device through which the radio access point device communicates via a network to the provisioning server, deriving an identity of a regional internet service provider server that serves the gateway router device and evaluating the location of the regional service provider server.

8. The method of claim 3, and further comprising receiving from the radio access point device data identifying one or more macro base transceiver stations detected by the radio access point device, and wherein determining comprises evaluating known locations for the one or more macro base transceiver stations detected by the radio access point device with respect to the locations of boundaries of the sub-regions.

9. The method of claim 1, wherein determining is based on an identifier assigned to the radio access device and an expected location for the radio access device stored at the provisioning server for that identifier.

10. The method of claim 1, wherein selecting is based on a particular subset of the plurality of radio access point gateway devices that the radio access point device is assigned to, the particular subset comprising multiple redundant radio access point gateway devices to which the radio access point device is assigned.

11. The method of claim 10, wherein selecting comprises selecting a set of location area codes for the radio access point device such that multiple radio access point devices served by the same radio access point gateway device use the same set of location area codes.

12. The method of claim 1, and further comprising at the radio access point device, scanning a local radio environment to detect location area codes broadcasted by neighboring radio access point devices operating in the wireless cellular communication network, and selecting a location area code from the set of candidate location area codes received from the provisioning server that does not conflict with location area codes used by neighboring radio access point devices.

13. An apparatus comprising:
a network interface unit configured to enable communications over a network;
a controller configured to be coupled to the network interface unit and configured to:
store data representing sub-regions of a geographical coverage area of a wireless cellular communication network such that each sub-region covers no more than one timezone;
store data that assigns a plurality of sets of location area codes to each sub-region, wherein each location area code serves as a unique reference for a location of a wireless user device during a communication session in the wireless cellular communication network;
store data that assigns respective ones of a plurality of radio access point gateway devices to a corresponding set of location area codes, the radio access point gateway devices serving as gateways for control messaging and traffic to and from corresponding radio access point devices;
determine in which sub-region a radio access point device configured to operate in the wireless cellular communication network is located based on the stored data representing the sub-regions and an expected location or actual location of the radio access point device; and
select a set of location area codes among the plurality of sets of location area codes assigned to the sub-region in which the radio access point device is determined to be located and based on at least one particular radio access point gateway device of the plurality of radio access point gateway devices that the radio access point device is assigned to, and send the selected set of location area codes to the radio access point device.

14. The apparatus of claim 13, wherein the controller is configured to store data representing the sub-regions comprising coordinate data describing locations of boundaries of each sub-region.

15. The apparatus of claim 14, wherein the controller is configured to receive from the radio access point device latitude/longitude location data for the radio access point device, and to determine in which sub-region the radio access point device is located by evaluating the latitude/longitude location data of the radio access point device with respect to the locations of the boundaries of the sub-regions.

16. The apparatus of claim 13, wherein the controller is configured to select the set of location area codes based further on a particular subset of the plurality of radio access point gateway devices that the radio access point device is assigned to, the particular subset comprising multiple redundant radio access point gateway devices to which the radio access point device is assigned.

17. The apparatus of claim 16, wherein the controller is configured to select a set of location area codes for the radio access point device such that multiple radio access point devices served by the same radio access point gateway device use the same set of location area codes.

18. The apparatus of claim 13, and wherein the controller is further configured to store the data assigning radio access point gateway devices to corresponding sets of location area codes such that a radio access point gateway device is assigned to sets of location area codes for multiple sub-regions.

19. A non-transitory computer readable medium storing instructions that, when executed by a processor, cause the processor to:
store data representing sub-regions of a geographical coverage area of a wireless cellular communication network such that each sub-region covers no more than one timezone and storing data that assigns a plurality of sets of location area codes to each sub-region, wherein each location area code serves as a unique reference for a location of a wireless user device during a communication session in the wireless cellular communication network;
store data that assigns respective ones of a plurality of radio access point gateway devices to a corresponding set of location area codes, the radio access point gateway devices serving as gateways for control messaging and traffic to and from corresponding radio access point devices;
determine in which sub-region a radio access point device configured to operate in the wireless cellular communication network is located based on the stored data representing the sub-regions and an expected location or actual location of the radio access point device; and
select a set of location area codes among the plurality of sets of location area codes assigned to the sub-region in which the radio access point device is determined to be located and based on at least one particular radio access point gateway device of the plurality of radio access point gateway devices that the radio access point device is assigned to, and send the selected set of location area codes to the radio access point device.

20. The non-transitory computer readable medium of claim 19, wherein the instructions that cause the processor to store data representing the sub-regions comprise instructions that cause the processor to store data describing locations of boundaries of each sub-region.

21. The non-transitory computer readable medium of claim 20, and further comprising instructions that, when executed by the processor, cause the processor to receive from the radio access point device latitude/longitude location data for the radio access point device, and the instructions that cause the processor to determine comprise instructions that cause the processor to determine in which sub-region the radio access point device is located by evaluating the latitude/longitude location data of the radio access point device.

22. The non-transitory computer readable medium of claim 19, wherein the instructions that cause the processor to select comprise instructions that cause the processor to select the set of location area codes based on a particular subset of the plurality of radio access point gateway devices that the radio access point device is assigned to, the particular subset comprising multiple redundant radio access point gateway devices to which the radio access point device is assigned.

23. The non-transitory computer readable medium of claim 19, wherein the instructions that cause the processor to store comprise instructions that cause the processor to store the data assigning radio access point gateway devices to corresponding sets of location area codes comprise instructions that cause the processor to store data such that a radio access point gateway device is assigned to sets of location area codes for multiple sub-regions.

* * * * *